United States Patent
Kleinau

(10) Patent No.: US 9,663,139 B2
(45) Date of Patent: May 30, 2017

(54) ELECTRIC MOTOR FEEDFORWARD CONTROL UTILIZING DYNAMIC MOTOR MODEL

(71) Applicant: STEERING SOLUTIONS IP HOLDING CORPORATION, Saginaw, MI (US)

(72) Inventor: Julie A. Kleinau, Bay City, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 107 days.

(21) Appl. No.: 14/190,757

(22) Filed: Feb. 26, 2014

(65) Prior Publication Data

US 2014/0239860 A1 Aug. 28, 2014

Related U.S. Application Data

(60) Provisional application No. 61/769,262, filed on Feb. 26, 2013.

(51) Int. Cl.
*H02P 23/12* (2006.01)
*B62D 5/04* (2006.01)
(Continued)

(52) U.S. Cl.
CPC ............. *B62D 5/046* (2013.01); *H02P 6/157* (2016.02); *H02P 21/22* (2016.02); *H02P 2207/05* (2013.01)

(58) Field of Classification Search
USPC ....... 318/400.14, 808, 809.504, 432, 400.23; 701/30.2, 32.9, 41, 42
See application file for complete search history.

(56) References Cited

U.S. PATENT DOCUMENTS 4,713,596 A 12/1987 Bose
4,733,149 A 3/1988 Culberson
(Continued)

FOREIGN PATENT DOCUMENTS

CN 1675099 A 9/2005
CN 1741368 A 3/2006
(Continued)

OTHER PUBLICATIONS

European Search Report for EP Application No. 12196930.7, mailed from the European Patent Office on Mar. 22, 2013.
(Continued)

*Primary Examiner* — Jorge L Carrasquillo
(74) *Attorney, Agent, or Firm* — Cantor Colburn LLP

(57) ABSTRACT

A motor control system comprising a motor configured to operate at a rotational velocity and a control module in communication with the motor is provided. The control module is configured to receive a torque command indicating a desired amount of torque to be generated by the motor, obtain a rotational velocity of the motor, receive a desired phase advance angle for driving the motor; and generate a voltage command indicating a voltage magnitude to be applied to the motor based on the rotational velocity of the motor, the motor torque command, and the desired phase advance angle by using a plurality of dynamic inverse motor model equations that (i) allow the desired phase advance angle to exceed an impedance angle of the motor and (ii) specify that the voltage magnitude is a function of a voltage magnitude of a previous voltage command.

18 Claims, 13 Drawing Sheets

(51) Int. Cl.
*H02P 6/15* (2016.01)
*H02P 21/22* (2016.01)

(56) References Cited

U.S. PATENT DOCUMENTS

| | | | |
|---|---|---|---|
| 4,920,306 A | 4/1990 | Mard et al. | |
| 5,196,778 A | 3/1993 | Hayashida | |
| 5,223,775 A | 6/1993 | Mongeau | |
| 5,410,234 A | 4/1995 | Shibata et al. | |
| 5,652,495 A | 7/1997 | Narazaki et al. | |
| 5,927,430 A | 7/1999 | Mukai et al. | |
| 5,962,999 A | 10/1999 | Nakamura et al. | |
| 6,002,234 A * | 12/1999 | Ohm | H02P 6/15 318/438 |
| 6,021,251 A | 2/2000 | Hammer et al. | |
| 6,104,148 A | 8/2000 | Kumar et al. | |
| 6,152,254 A | 11/2000 | Phillips | |
| 6,161,068 A | 12/2000 | Kurishige et al. | |
| 6,222,334 B1 | 4/2001 | Tamagawa et al. | |
| 6,288,515 B1 | 9/2001 | Hiti et al. | |
| 6,370,459 B1 | 4/2002 | Phillips | |
| 6,465,975 B1 | 10/2002 | Naidu | |
| 6,499,559 B2 | 12/2002 | McCann et al. | |
| 6,605,912 B1 * | 8/2003 | Bharadwaj | H02P 6/142 318/400.02 |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Kleinau et al. | |
| 7,145,310 B2 | 12/2006 | Ihm et al. | |
| 7,199,549 B2 | 4/2007 | Kleinau et al. | |
| 7,207,412 B2 | 4/2007 | Uryu | |
| 7,394,214 B2 | 7/2008 | Endo et al. | |
| 7,548,035 B2 * | 6/2009 | Endo | B62D 5/046 318/400.02 |
| 7,576,506 B2 | 8/2009 | Kleinau et al. | |
| 7,952,308 B2 | 5/2011 | Schulz et al. | |
| 8,633,766 B2 | 1/2014 | Khlat et al. | |
| 8,896,244 B2 | 11/2014 | Kleinau | |
| 2002/0175649 A1 | 11/2002 | Reutlinger | |
| 2003/0076065 A1 * | 4/2003 | Shafer | B62D 5/0496 318/567 |
| 2003/0146041 A1 | 8/2003 | Kanda | |
| 2004/0095089 A1 * | 5/2004 | Collier-Hallman | B62D 5/046 318/567 |
| 2004/0195993 A1 | 10/2004 | Yoshimoto et al. | |
| 2005/0073280 A1 | 4/2005 | Yoshinaga et al. | |
| 2006/0100766 A1 | 5/2006 | Schwarz et al. | |
| 2007/0043490 A1 | 2/2007 | Yokota et al. | |
| 2007/0046126 A1 | 3/2007 | Sagoo et al. | |
| 2007/0103105 A1 | 5/2007 | Endo et al. | |
| 2007/0132446 A1 * | 6/2007 | Kleinau | B60L 15/025 324/160 |
| 2007/0278032 A1 | 12/2007 | Sakaguchi et al. | |
| 2008/0167779 A1 | 7/2008 | Suzuki | |
| 2008/0191656 A1 * | 8/2008 | Satake | B60L 11/1803 318/722 |
| 2009/0026994 A1 | 1/2009 | Namuduri et al. | |
| 2009/0027000 A1 | 1/2009 | Gallegos-Lopez et al. | |
| 2009/0069979 A1 | 3/2009 | Yamashita et al. | |
| 2009/0114470 A1 | 5/2009 | Shimizu et al. | |
| 2009/0189555 A1 | 7/2009 | Chen | |
| 2009/0234538 A1 | 9/2009 | Ta et al. | |
| 2009/0267555 A1 | 10/2009 | Schulz et al. | |
| 2010/0231148 A1 | 9/2010 | Tobari et al. | |
| 2011/0153162 A1 | 6/2011 | Kezobo et al. | |
| 2011/0169432 A1 | 7/2011 | Dean | |
| 2011/0175556 A1 | 7/2011 | Tobari et al. | |
| 2012/0112549 A1 | 5/2012 | Perisic et al. | |
| 2012/0221208 A1 | 8/2012 | Kojo et al. | |
| 2012/0313701 A1 | 12/2012 | Khlat et al. | |
| 2013/0154524 A1 * | 6/2013 | Kleinau | H02P 3/18 318/376 |
| 2013/0187579 A1 | 7/2013 | Rozman et al. | |
| 2013/0261896 A1 | 10/2013 | Gebregergis et al. | |
| 2014/0191699 A1 | 7/2014 | Dixon | |
| 2014/0265961 A1 | 9/2014 | Gebregergis et al. | |
| 2014/0265962 A1 | 9/2014 | Gebregergis et al. | |
| 2014/0375239 A1 | 12/2014 | Kim et al. | |
| 2015/0155811 A1 * | 6/2015 | Merienne | B60L 3/0038 318/400.02 |
| 2015/0222210 A1 | 8/2015 | Kleinau et al. | |

FOREIGN PATENT DOCUMENTS

| | | | |
|---|---|---|---|
| CN | 101218146 A | 7/2008 | |
| CN | 101399516 B | 4/2009 | |
| CN | 101456429 A | 6/2009 | |
| CN | 101981804 A | 2/2011 | |
| CN | 102751936 A | 10/2012 | |
| EP | 1720242 A1 | 11/2006 | |
| EP | 1914878 A2 | 4/2008 | |
| EP | 2003010 A2 | 12/2008 | |
| JP | 2000108916 A | 4/2000 | |
| JP | 2001247049 A | 9/2001 | |
| JP | 2003170850 A | 6/2003 | |
| JP | 2012224258 A | 11/2012 | |
| WO | 2014006329 A2 | 1/2014 | |
| WO | WO 2014006329 A2 * | 1/2014 | B60L 3/0038 |

OTHER PUBLICATIONS

Kirtley, James; 6.061 Introduction to Electric Power Systems; Spring 2011; Massachussetts Institute of Technology.

F. Briz, M.W. Degner and R.D. Lorenz; "Analysis and Design of current Regulators Using Complex Vectors"; IEEE Industry Applications Society; Annual Meeting; New Orleans, Louisiana; Oct. 5-9, 1997; pp. 1504-1511.

Lennart Harnefors and Hans-Peter Nee; "Model-Based Current Control of AC Machines Using the Internal Model Control Method"; IEEE Transactions on Industry Applications; vol. 34, No. 1; Jan./Feb. 1998; pp. 133-141.

Chinese Office Action for Chinese Patent Application No. 201310104183.7 issued on Jan. 6, 2015.

Chinese Office Action for Chinese Application No. 201210599015.5 dated Oct. 23, 2014; 29 pages.

European Search Report from related Application No. 15171189: Mail Date Jan. 4, 2016; 9 pages.

Office Action issued in related CN Application No. 201400942309, issued Jan. 18, 2016, 34 pages.

English translation of office action issued in related CN Application No. 201400942309, issued Jan. 18, 2016, 16 pages.

Extended European search report for related European application No. 16153434.2, dated: Jul. 6, 2016, p. 8.

Jeong et al., "Fault Detection and Fault-Tolerant Control of Interior Permanent-Magnet Motor Drive System for Electric Vehicle", IEEE Transactions on Industry Applications, vol. 41, No. 1, Jan./Feb. 2005, pp. 46-51.

* cited by examiner

ELECTRIC MOTOR FEEDFORWARD CONTROL UTILIZING DYNAMIC MOTOR MODEL

CROSS-REFERENCES TO RELATED APPLICATIONS

This patent application claims priority to U.S. Provisional Patent Application Ser. No. 61/769,262, filed Feb. 26, 2013, which is incorporated herein by reference in its entirety.

BACKGROUND OF THE INVENTION

Electrical power steering (EPS) systems in vehicles use an electric motor connected to the steering gear or steering column that is electronically controlled to provide a torque to assist a driver in steering the vehicle. EPS systems typically include an electric motor and a controller. The controller receives steering torque information from a torque sensor and controls the motor to transmit assist torque to the wheels, e.g., by applying the torque to the steering column. One type of an electric motor is a Permanent Magnet (PM) brushless motor.

Sinusoidal Brushless Motor Control is a technique used to control brushless motors in EPS systems. Some such techniques utilize a feedforward motor voltage command/control utilizing a steady state representation of the motor characteristics.

SUMMARY OF THE INVENTION

In an embodiment of the invention, a motor control system comprises a motor configured to operate at a rotational velocity and a control module in communication with the motor is provided. The control module is configured to receive a torque command indicating a desired amount of torque to be generated by the motor, obtain a rotational velocity of the motor, receive a desired phase advance angle for driving the motor; and generate a voltage command indicating a voltage magnitude to be applied to the motor based on the rotational velocity of the motor, the motor torque command, and the desired phase advance angle by using a plurality of dynamic inverse motor model equations that (i) allow the desired phase advance angle to exceed an impedance angle of the motor and (ii) specify that the voltage magnitude is a function of a voltage magnitude of a previous voltage command.

In another embodiment of the invention, a method for controlling a motor of an electronic power steering (EPS) system comprises receiving a torque command indicating a desired amount of torque to be generated by the motor. The method obtains a rotational velocity of the motor. The method receives a desired phase advance angle for driving the motor. The method generates a voltage command indicating a voltage magnitude to be applied to the motor based on the rotational velocity of the motor, the motor torque command, and the desired phase advance angle by using a plurality of dynamic inverse motor model equations. The inverse motor model equations allow the desired phase advance angle to exceed an impedance angle of the motor and specify that the voltage magnitude is a function of a voltage magnitude of a previous voltage command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the invention provide a controller for controlling a motor of an electric power steering (EPS) system by supplying a voltage command at a phase advance angle up to 90 degrees and beyond 90 degrees (i.e., the phase advance angle above the impedance angle of the motor). The controller uses a motor model that includes equations for calculating a voltage command based on inputs that include a motor velocity, a torque command, and a phase advance angle. The controller receives the inputs, calculates voltage commands specifying required voltages according to the motor model, and sends the voltage commands to the electric motor to control the torque generated by the motor. In one embodiment, the motor model allows for calculating the voltage commands even when the torque generated from the motor voltage is opposite to the rotational direction of the motor (i.e., when the motor operates in quadrant II and IV) and the phase advance angle is up to or greater than 90 degrees. In one embodiment, the motor model allows for such calculation by limiting motor regenerative current in quadrants II and IV.

Figure 1:
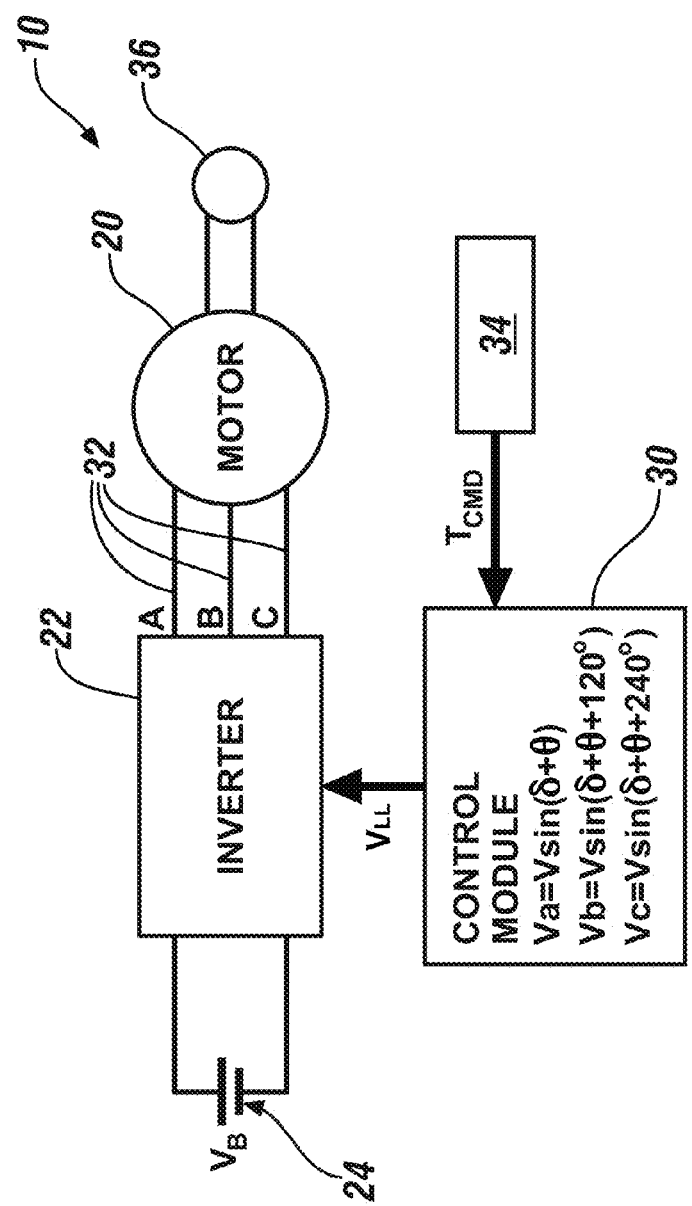
FIG. 1 is an exemplary schematic illustration of a motor control system in accordance with exemplary embodiments.

Referring now to the Figures, where the invention will be described with reference to specific embodiments, without limiting same, FIG. 1 illustrates a motor control system 10 in accordance with one aspect of the invention. In the exemplary embodiment as shown, the motor control system 10 includes a motor 20, an inverter 22, a supply voltage 24, and a control module 30 (also referred to as a controller). The voltage supply 24 supplies a supply voltage $V_B$ to the motor 20. In one embodiment, the voltage supply 24 is a 12 volt battery. However, it is to be understood that other types of voltage supplies may be used as well. The inverter 22 is connected to the motor 20 by a set of three connections 32 that are labeled as 'A', 'B' and 'C'. In one embodiment, the motor 20 is a polyphase, permanent magnet (PM) brushless motor. In this example, the motor 20 is a three-phase PM motor. The control module 30 is connected to the motor 20 through the inverter 22. The control module 30 receives a motor torque command $T_{CMD}$ from a source 34 such as, for example, a steering control system. The control module 30 includes control logic for sending a motor voltage command $V_{LL}$ to the motor 20 through the inverter 22.

Figure 2:
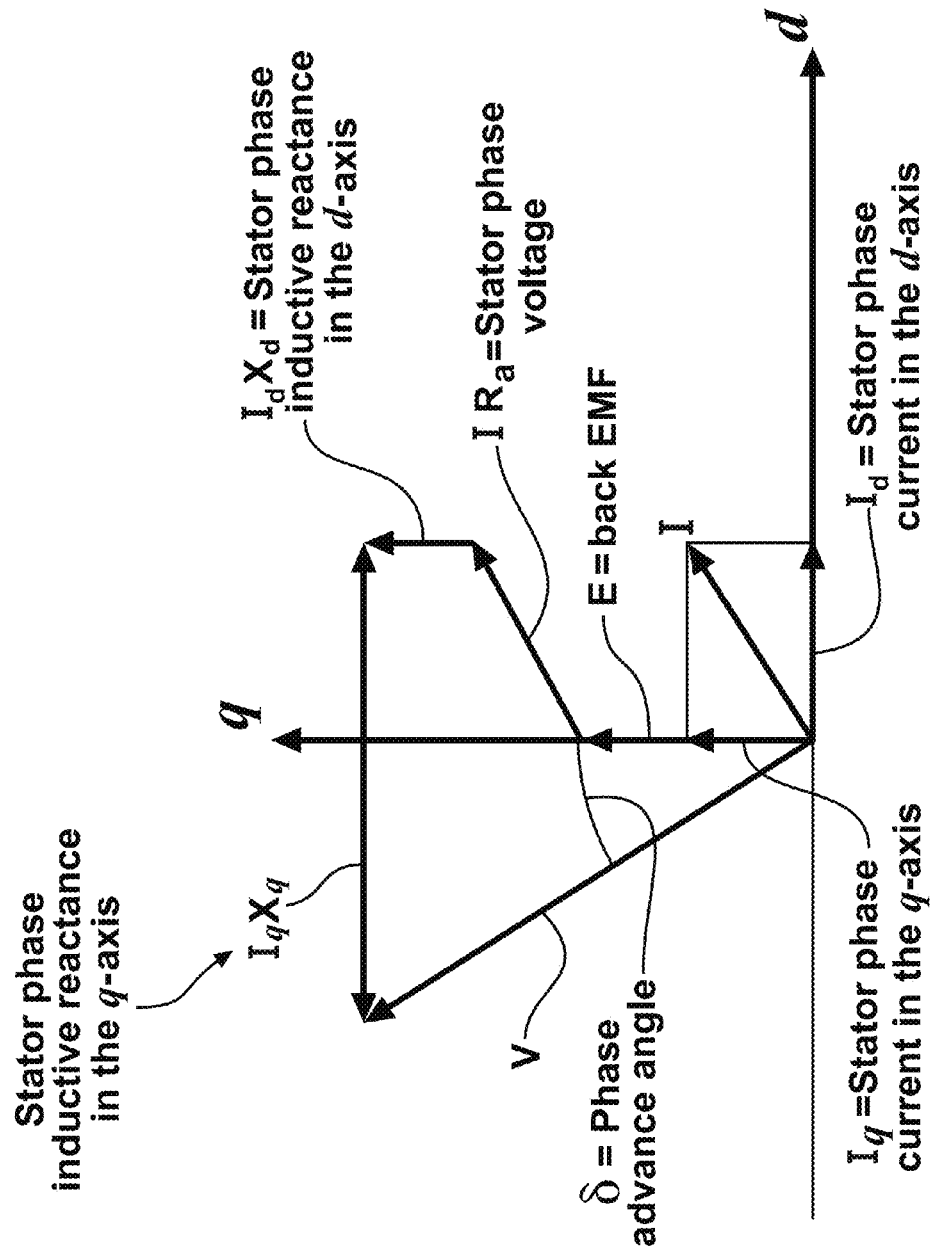
FIG. 2 is a phasor diagram of a motor in accordance with exemplary embodiments.

Referring now to FIGS. 1 and 2, the motor 20 is operated such that a phase of the motor voltage command $V_{LL}$ shifts with respect to a phase of a developed back electromotive force (BEMF) voltage $E_g$ of the motor 20. A phasor diagram of the motor 20 is shown in FIG. 2 and illustrates a voltage vector V having a magnitude that is the motor voltage command $V_{LL}$. A BEMF voltage vector E has a magnitude that is the BEMF voltage $E_g$. An angle between voltage vector V and the BEMF voltage vector E is defined and is referred to as a phase advance angle δ. A stator phase current is referred to as I, a stator phase current in the quadrature axis (q-axis) is referred to as $I_q$, a stator phase current in the direct axis (d-axis) is referred to as $I_d$, a stator phase reactance in the respective d-axis is referred to as $X_d$, the stator phase reactance in the q-axis is referred to as $X_q$, and a stator phase resistance at phase A is referred to as $R_a$.

In one embodiment, an encoder 36 (shown in FIG. 1) is used to measure an angular position θ of a rotor (not shown in FIG. 1) of the motor 20. The angular position θ of the motor 20 is used to determine the input phase voltages $V_a$, $V_b$ and $V_c$, where input phase voltage $V_a$ corresponds with connection A, input phase voltage $V_b$ corresponds with connection B, and input phase voltage $V_c$ corresponds with connection C. The control module 30 includes control logic for calculating input phase voltages $V_a$, $V_b$, and $V_c$ by the following equations:

$V_a = V \sin(δ+θ)$   Equation 1

$V_b = V \sin(δ+θ+120°)$   Equation 2

$V_c = V \sin(δ+θ+240°)$   Equation 3

Figure 3:
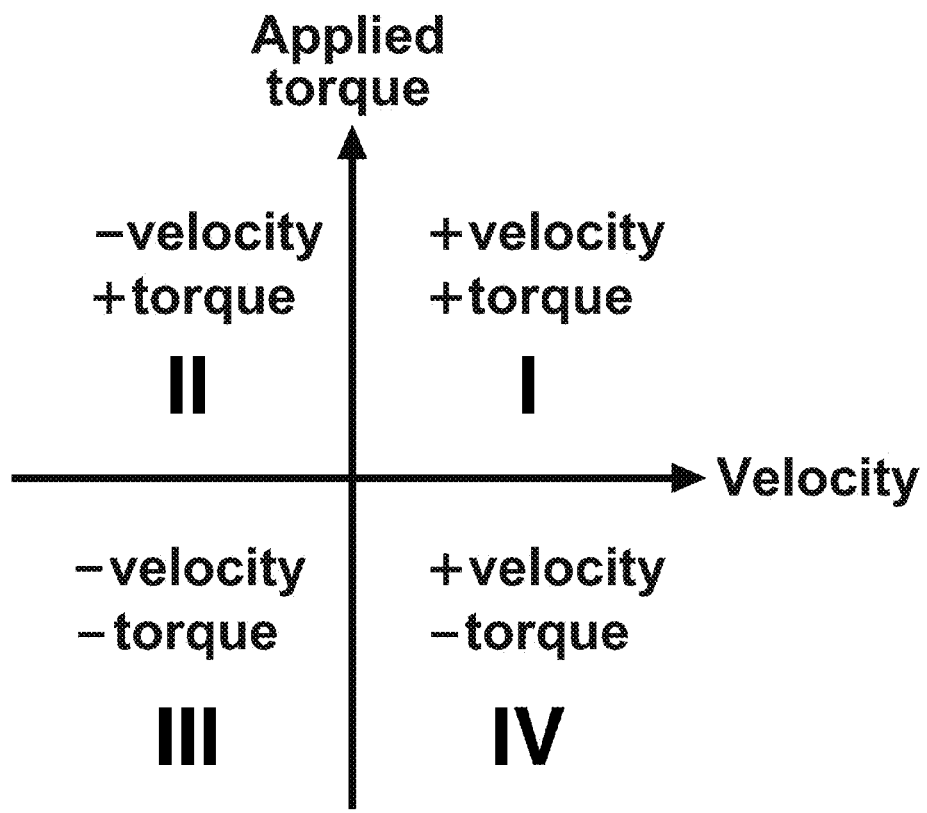
FIG. 3 is a diagram illustrating the four quadrants of operation for a motor in accordance with exemplary embodiments.

The motor 20 rotates in a clockwise as well as a counterclockwise direction, and may also produce torque in both the clockwise and counterclockwise direction during operation. Therefore, the motor 20 is capable of operating in all four quadrants of operation, which is illustrated in FIG. 3. FIG. 3 is an exemplary diagram illustrating the four quadrants of operation for the motor 20, where quadrant I includes positive velocity and positive torque, quadrant II includes negative velocity and positive torque, quadrant III includes negative velocity and negative torque, and quadrant IV includes positive velocity and negative torque. In the event that the motor 20 is operating in either quadrant II or quadrant IV, the motor 20 may create a regenerative current that is sent back into the DC power supply 24 (shown in FIG. 1).

The control module 30 includes control logic for monitoring the motor 20 for a rotational velocity. Specifically, the control module 30 may be in communication with a speed measuring device (not shown in FIG. 1) that provides an output indicating an angular velocity $ω_m$ of the motor 20. Alternatively, the angular velocity $ω_m$ of the motor 20 may be calculated by differentiating the angular position θ, where dθ/dt=$ω_m$. The angular velocity $ω_m$ may also be referred to as the mechanical velocity of the motor 20, and is measured in radians/second. The control module 30 also includes control logic for also calculating an electrical velocity $ω_e$ of the motor 20, where the electrical velocity is calculated by multiplying the mechanical velocity $ω_m$ by a number of poles $N_p$ of the motor 20, and dividing the product of the mechanical velocity $ω_m$ and the number of poles $N_p$ by two.

In one embodiment, a memory (not shown) of the control module 30 stores several motor circuit parameters. Specifically, in one embodiment, the motor circuit parameters include a motor voltage constant $K_e$ that is measured in volts/radian/second, a motor and control module output circuit resistance R that is measured in Ohms, and motor inductances $L_q$ and $L_d$ that are measured in Henries. In another embodiment, the control module 30 may include control logic for calculating the motor circuit parameters including motor voltage constant $K_e$, the motor and control module output circuit resistance R, and the motor inductances $L_q$ and $L_d$. In such an embodiment, the control logic may adjust the calculated motor output circuit resistance R and the calculated motor voltage constant $K_e$ based on the temperature of the motor. The control logic may also adjust the calculated motor voltage constant $K_e$ and the calculated motor inductances $L_q$ and $L_d$ with respect to the motor current in order to comprehend the saturation effects. The control module 30 also includes control logic for monitoring the supply voltage $V_B$ to the motor 20.

In an embodiment, the control module 30 is configured to generate a voltage command using a motor control model. An example of a motor control model for a sinusoidal permanent magnet (PM) motor includes the following equations:

$$V\cos(δ) = V_q \qquad \text{Equation 4}$$
$$= \left(\frac{L_q}{R}s + 1\right)RI_q + K_e ω_m + L_d ω_e I_d$$

$$-V\sin(δ) = V_d \qquad \text{Equation 5}$$
$$= \left(\frac{L_q}{R}s + 1\right)RI_q - L_q ω_e I_q$$

$$T_e = K_e I_q \qquad \text{Equation 6}$$

where:
V is the magnitude of the voltage applied to the motor, i.e., the motor voltage $V_{LL}$;
$V_q$ is the q-axis vector component of motor voltage in phase with the motor BEMF;
$V_d$ is the d-axis vector component of motor voltage 90 degrees out of phase with the motor BEMF;
δ is the angle of the applied voltage relative to the BEMF in radians (the phase advance angle);
$L_q$ and $L_d$ are the stator q-axis and d-axis inductances, respectively (Henries);
R is the motor circuit resistance, including the motor stator and controller hardware (Ohms);
$K_e$ is the motor voltage constant (Voltage/Radian/second);
$ω_m$ is the rotor mechanical velocity (Radian/second);
$ω_e$ is the rotor electrical velocity (Radian/second);
$I_d$ is the direct (d) axis current (Amperes);
$I_q$ is the quadrature (q) axis current (Amperes);
$T_e$ is the electromagnetic torque (Newton meter); and
s is the Laplace operator.

Setting the desired motor torque command $T_{CMD}$ equal to $T_e$ in the above equations 4-6 and solving for the voltage and phase advance angle required to deliver the desired torque yields the following:

$$V_q = T_{CMD}\frac{R}{K_e}\left(\frac{L_q}{R}s+1\right)+K_e\omega_m+\frac{\omega_e L_d}{R}\left(\frac{\frac{T_{CMD}}{K_e}\omega_e L_q - V\sin(\delta)}{\frac{L_d}{R}s+1}\right) \quad \text{Equation 7}$$

$$V_d = R\left(\frac{L_d}{R}s+1\right)\left(\frac{V\cos(\delta)-T_{CMD}\frac{R}{K_e}\left(\frac{L_q}{R}s+1\right)-K_e\omega_m}{\omega_e L_d}\right)-\frac{T_{CMD}}{K_e}\omega_e L_q \quad \text{Equation 8}$$

In one embodiment, the control module 30 is configured to use the equations 7 and 8 to solve for the final motor voltage magnitude V (i.e., $V_{LL}$ in FIG. 1) for all four quadrants. For the quadrants I and III, the control module 30 uses the equation 7 to solve for $V_q$ and to divide $V_q$ by cosine of the phase advance angle as shown in the following equation 9:

$$V = \frac{V_q}{\cos(\delta)} \quad \text{Equation 9}$$

For the quadrants II and IV (e.g., when the phase advance angle is over 90 degrees), the control module 30 uses the equations 7 and 8 to solve for $V_q$ and $V_d$ and uses the $V_q$ and $V_d$ in the following equation 10:

$$V = \text{Sign}(V_q)\sqrt{V_q^2+V_d^2} \quad \text{Equation 10}$$

where Sign( ) is a function that outputs the sign (e.g., positive or negative) of a value. It is to be noted that the control module 30 may use the equation 10 to compute the final motor voltage magnitude V for all four quadrants I-IV.

In an embodiment, the control module 30 uses a simplified equation to calculate the final voltage magnitude. Specifically, the equation 8 for calculating $V_d$ may be simplified by using a directly-commanded d-axis current $I_d$. That is, using a directly commanded value as $I_d$ instead of using $I_d$ as a variable in the equation 8 allows for avoiding the implementation of the double derivative operation (i.e., $$\left(\frac{L_q}{R}s+1\right)\times\left(\frac{L_q}{R}s+1\right)$$

for $$T_{CMD}\frac{R}{K_e})$$

of the equation 8. Calculating $I_d$ in order to directly command $I_d$ is described further below by reference to FIGS. 4a and 4b.

In an embodiment, the control module 30 implements the following equation 11 to avoid a double derivative operation:

$$V_d = I_{d\_des}\frac{\sqrt{3}}{2}R\left(\frac{L_d}{R}s+1\right)-\frac{T_{CMD}}{K_e}\omega_e L_q \quad \text{Equation 11}$$

The control module 30 may be configured to use the equations 7 and 11 to solve for the final motor voltage magnitude V for all four quadrants. For quadrants I and III, the control module 30 uses the equation 7 to solve for $V_q$ and uses the $V_q$ value in the equation 9 to solve for V. For quadrants II and IV, the control module 30 uses the equations 7 and 11 to solve for $V_q$ and $V_d$, and use the $V_q$, and $V_d$ values in the equation 10 to solve for V.

The equation 11 includes an $I_{d\_des}$ value that represents a desired amount of $I_d$ current. $I_{d\_des}$ may be a signal from a phase control sub-function representing the desired d-axis current $I_d$. This desired amount of $I_d$ current, in one embodiment, is calculated as an input to a regenerative current limiting function. An example of such a function is described in U.S. Patent Application Publication No. 2013/0154524, entitled "Motor Control System for Limiting Regenerative Current," filed on Dec. 15, 2011, the entire contents of which are incorporated herein by reference. A regenerative current limiting function is also described further below after the description of FIG. 11.

An exemplary motor control system as described in the above-incorporated U.S. Patent Application Publication No. 2013/0154524 provides techniques for limiting negative supply current, or regenerative current, that is produced by an electric motor when operating in either quadrant II or quadrant IV. The system calculates a value of a target field weakening current $I_{dTARGET}$, which is used as an input to calculate a motor voltage. The value $I_{d\_des}$ may be used by the system as the $I_{dTARGET}$ current.

In one embodiment, the equations 7, 8 and 11 for $V_q$ and $V_d$ above include derivative terms (e.g., $$T_{CMD}\frac{R}{K_e}\left(\frac{L_q}{R}s+1\right)$$

and $$I_{d\_des}\frac{\sqrt{3}}{2}R\left(\frac{L_d}{R}s+1\right)).$$

Discretizing a derivative can produce noise due to sampling and resolution effects at high frequencies. To address the noise, the controller 30 of one embodiment includes a digital filter (not shown in FIG. 1) to implement the derivative function utilizing a Fourier Series representation of a derivative with a Hamming window applied.

Figure 4A:
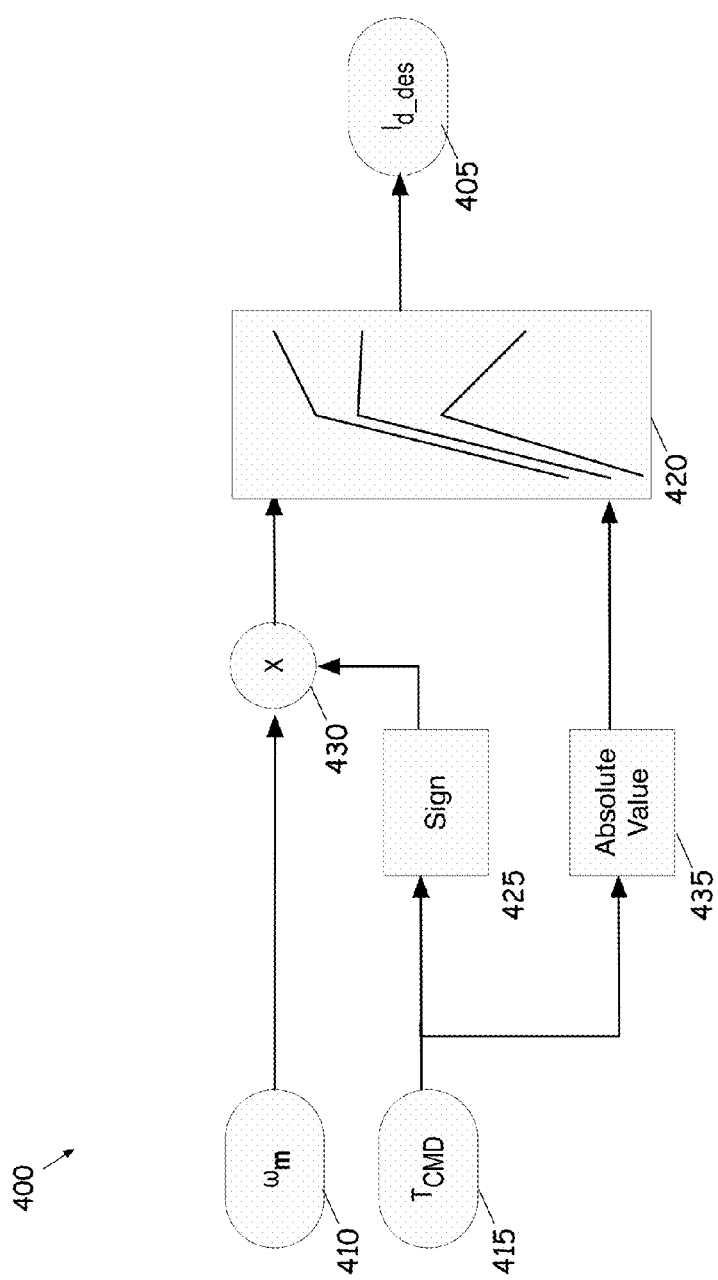
FIG. 4a is a block diagram that illustrates calculation of desired d-axis current in accordance with exemplary embodiments.

FIG. 4a is a block diagram that illustrates an implementation of desired d-axis current $I_{d\_des}$ calculation module 400. This d-axis current is calculated for directly commanding the $I_d$. This directly commanded $I_{d\_des}$ is used for $V_d$ calculations (e.g., in the equation 11) for quadrants II and IV only. In one embodiment, $I_{d\_des}$ 405 is a function of the motor velocity $\omega_m$ 410 and the absolute value of the torque command $T_{CMD}$ 415 as shown. In one embodiment, a sign block 425 identifies the sign (e.g., positive or negative) of the torque command $T_{CMD}$ 415, and the multiplier 430 multiplies the motor velocity $\omega_m$ 410 by the sign value (e.g., −1 or +1) of the torque command $T_{CMD}$ 415. In one embodiment, the resulting product is used to look up values from a look up table. The sign of this resulting product indicates the quadrant in which the motor is operating. For instance, when the sign of the resulting product is negative because the sign of the torque command is opposite to the sign of the motor velocity, the motor is operating in quadrants II or IV. When the sign of the resulting product is positive because the sign of the torque command is the same as the sign of the motor velocity, the motor is operating in quadrants I or III. The absolute value block 435 takes the amplitude of the torque command $T_{CMD}$ 415 and the amplitude is used to select a look up table.

Figure 4B:
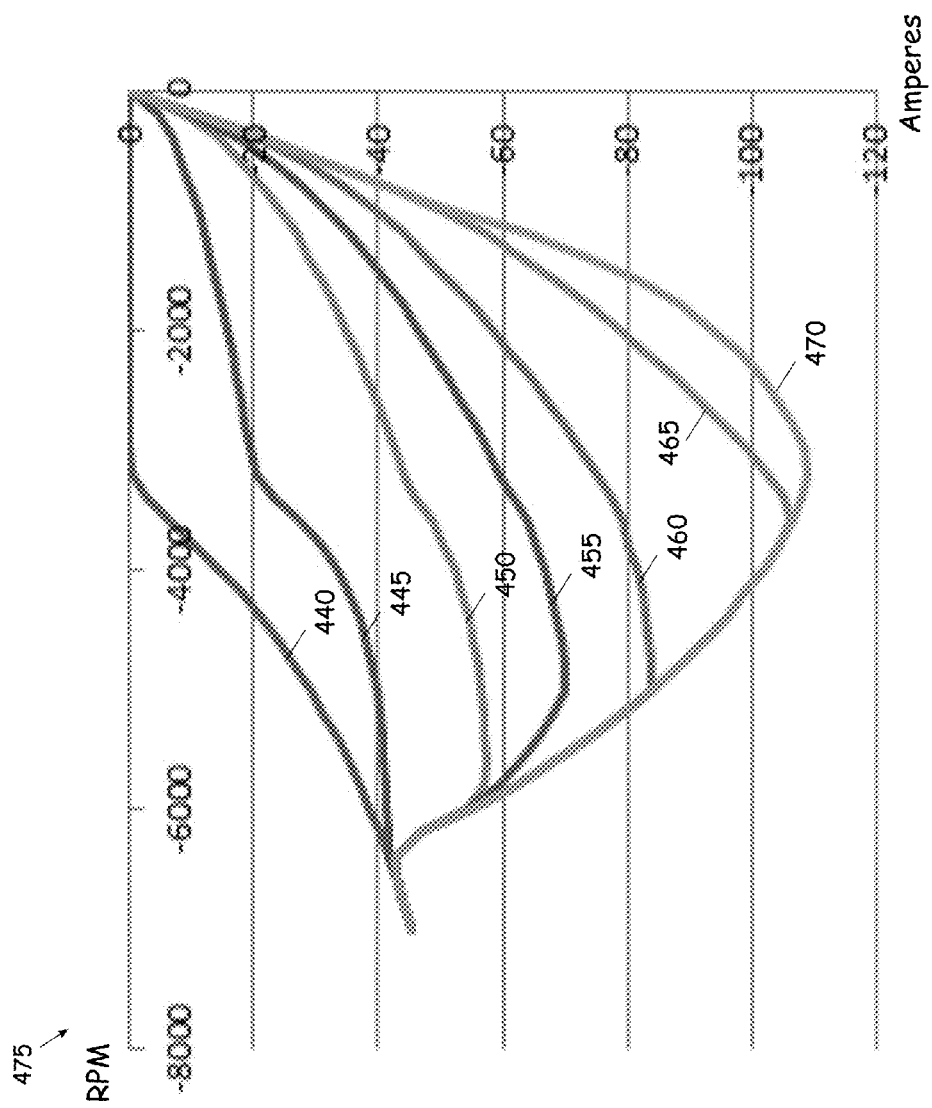
FIG. 4b illustrates lookup tables for finding desired d-axis current in accordance with exemplary embodiments.

In one embodiment, $I_{d\_des}$ can be determined from a set of calibratable, interpolated, fixed x, variable y lookup tables depicted as curves in a graph 420, each defined at a specific torque command. In one embodiment, the x-axis of the graph 420 represents the motor velocity multiplied by the sign of the torque command and the y-axis of the graph represents the desired current $I_{d\_des}$. FIG. 4b illustrates exemplary lookup tables depicted as curves 440-470 in a graph 475. The x-axis of the graph 475 represents the motor velocity multiplied by the sign of the torque command in revolutions per minute (RPM). The y-axis represents the desired current $I_{d\_des}$ in amperes. In one embodiment, when the amplitude of the torque command does not exactly match any of the torque command amplitudes for the different curves, an interpolation technique is employed to find the desired current $I_{d\_des}$ value. In one embodiment, when the motor velocity multiplied by the sign of the torque command is positive (i.e., when the motor is operating in quadrants I or III), $I_{d\_des}$ is set to zero. The corresponding portion of the graph is not depicted in FIG. 4b.

FIGS. 5-10 illustrate exemplary implementations of the equations 7, 8, and 11 for calculating voltage commands. Specifically, FIGS. 5a and 5b illustrate an exemplary approach for calculating $V_q$ (i.e., using the equation 7) and other terms of the equations 8 and 11. Implementations of static versions of the equations 7, 8, and 11 (i.e., without the derivative term s) are described in the above-incorporated U.S. Patent Application Publication No. 2013/0154524. An exemplary implementation of the equation 7 is also described in U.S. Pat. No. 7,157,878, the entire content of which is incorporated herein by reference.

Figure 5A:
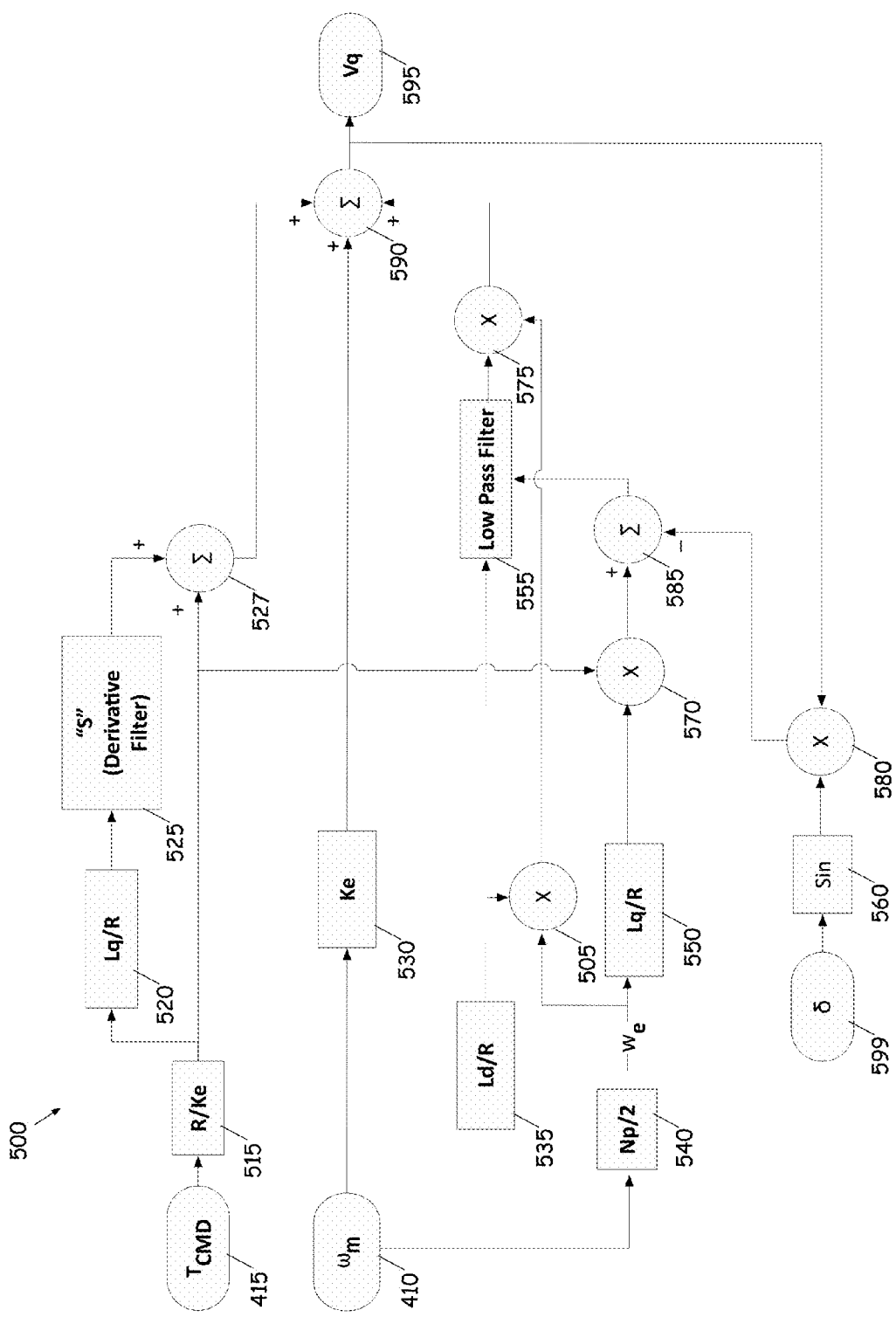
FIG. 5a is a block diagram that illustrates calculation of a voltage command in accordance with exemplary embodiments.

FIG. 5a is a block diagram that illustrates an implementation of a voltage command calculation module 500. Specifically, this module 500 calculates $V_q$ 595 according to the equation 8 in one embodiment. As shown, the module 500 takes as inputs the torque command 415, the motor velocity $\omega_m$ 410, and a phase advance angle $\delta$ 599, and outputs $V_q$ 595.

An $R/K_e$ block 515, an $L_q/R$ block 520, a derivative filter 525, and an adder 527 together implement the first term $$T_{CMD} \frac{R}{K_e}\left(\frac{L_q}{R}s + 1\right)$$

of the equation 7. Exemplary implementations of the derivative filter 525 are described further below by reference to FIGS. 6a and 6b. A $K_e$ block 530 implements the second term $K_e\omega_m$ of the equation 7. A $L_q/R$ block 535, a pole number block 540, an $L_q/R$ block 550, a low pass filter (LPF) 555, a sine block 560, multipliers 565-580, and an adder 585 together implement the third term $$\frac{\omega_e L_q}{R}\left(\frac{\frac{T_{CMD}}{K_e}\omega_e L_q - V\sin(\delta)}{\frac{L_d}{R}s + 1}\right)$$

of the equation 7. An exemplary implementation of the LPF 555 is described further below by reference to FIG. 7. In one embodiment, the LPF 555 may be bypassed.

The phase advance angle $\delta$ 599 that the sine block 560 takes as an input may be calculated by an $I_{d\_des}$ calculation block, which will be described further below by reference to FIG. 5b. The motor electrical velocity $\omega_e$ 542 is related to the motor mechanical velocity $\omega_m$ 410 and the number of motor poles by the equation $\omega_e$=(number of motor poles $N_p/2$)×$\omega_m$. The first, second, and third terms of the equation 7 is summed by an adder 590 to output $V_q$ 595 of the equation 7.

Figure 5B:
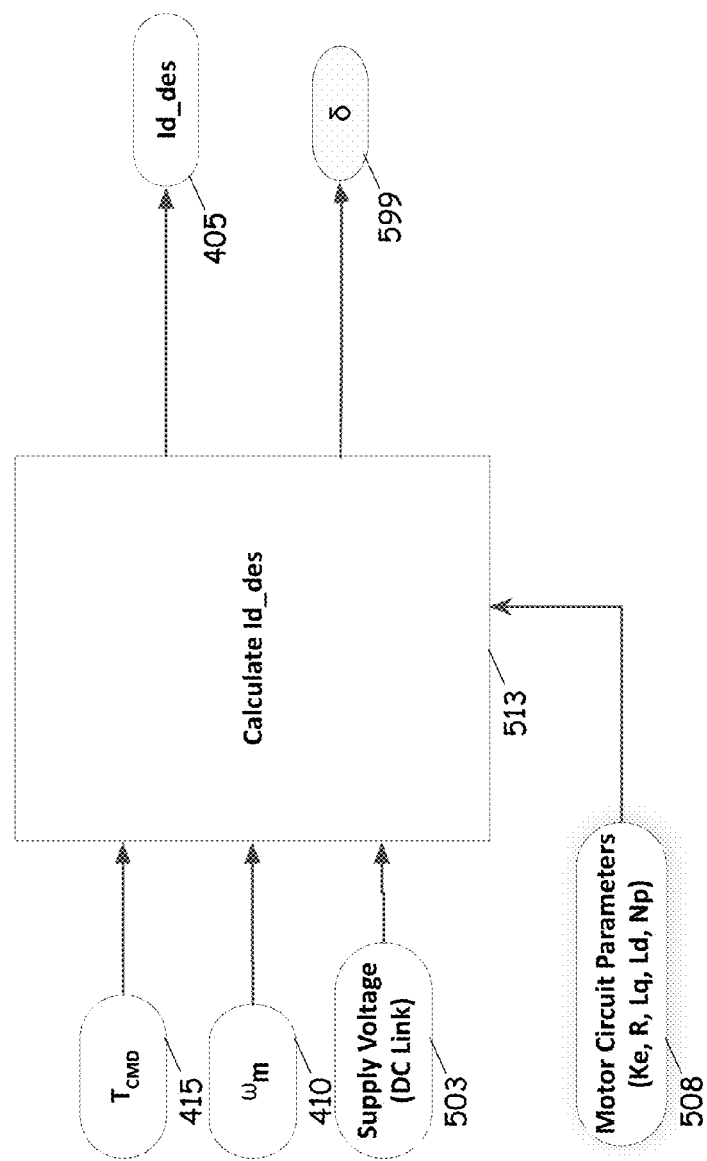
FIG. 5b is a block diagram that illustrates calculation of a desired amount of direct axis current in accordance with exemplary embodiments.

FIG. 5b is a block diagram that illustrates calculation of $I_{d\_des}$. Specifically, FIG. 5b illustrates an $I_{d\_des}$ calculation block 513. The $I_{d\_des}$ calculation block 513 is similar to the $I_{d\_des}$ calculation module 400 for quadrants II and IV described above by reference to FIG. 4a. The $I_{d\_des}$ calculation block 513 takes as inputs the torque command 415, the motor velocity $\omega_m$ 410, a supply voltage 503, and a set of motor circuit parameters 508. The $I_{d\_des}$ calculation block 513 calculates the $I_{d\_des}$ 405 and the phase advance angle $\delta$ 599. In one embodiment, the set of motor circuit parameters 508 includes an estimation of the motor circuit resistance R, an estimation of the q-axis stator inductance $L_q$, an estimation of the d-axis stator inductance $L_d$, an estimation of the motor voltage constant $K_e$, and a number of poles of the motor $N_p$.

Figure 6A:
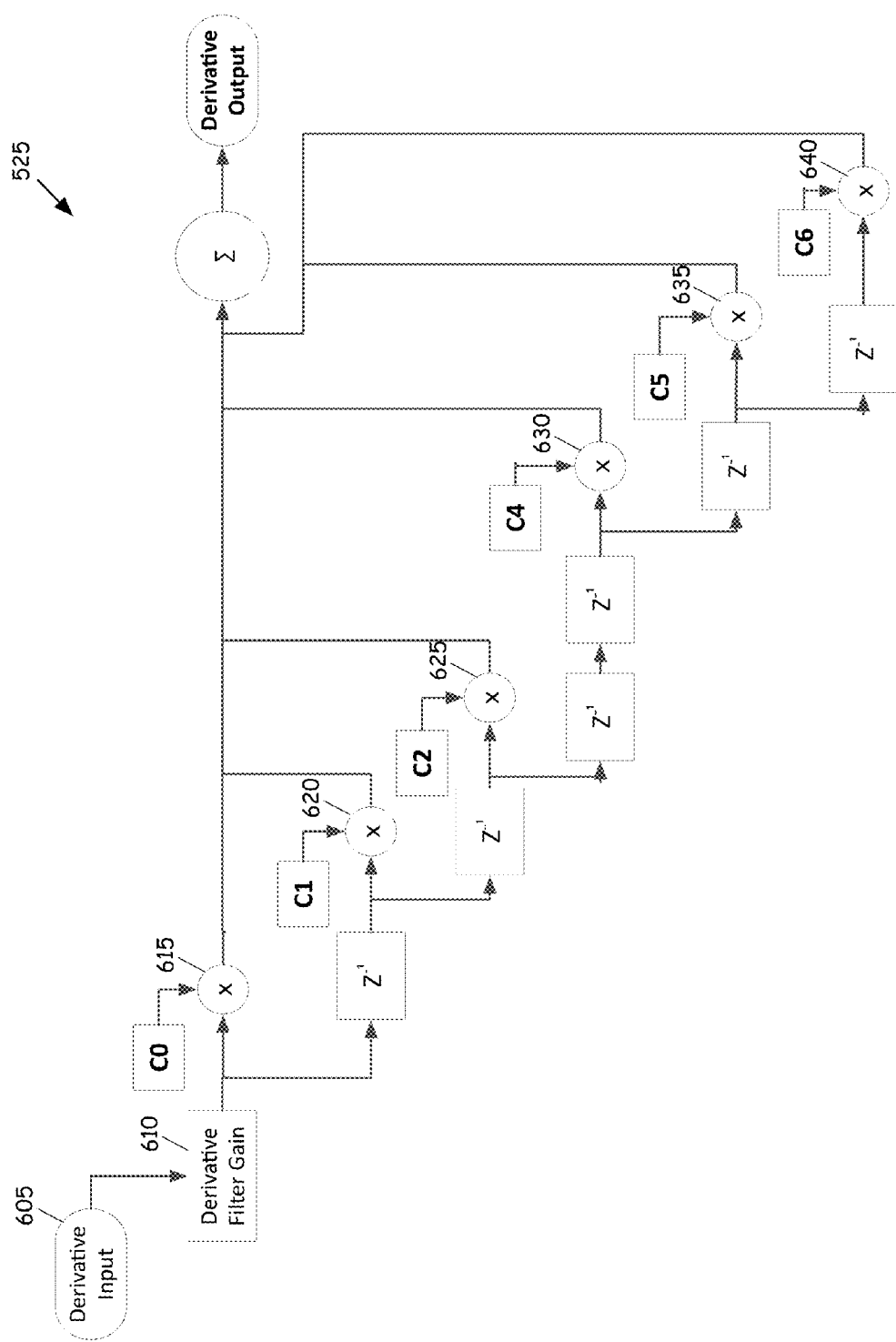
FIG. 6a illustrates an implementation of a derivative filter in accordance with exemplary embodiments.

FIG. 6a illustrates an exemplary non-recursive implementation of the derivative filter 525 of FIG. 5 in various embodiments. The derivative filter 525 may be used for calculating derivative terms of the equations 7, 8, and 11. For different derivative terms from different equations, the values of the derivative input 605 would be different. Also, the gain values that the derivative filter gain block 610 uses would be different for calculating the different derivative terms. In one embodiment, the gain values are in a range of float 0-200. In one embodiment, the $V_q$ filter coefficients include six constants, which are depicted in FIG. 6 as C0, C1, C2, C4, C5, and C6. Different sets of these constants are used for calculating the different derivative terms in one embodiment. It is to be noted that, in this example, the derivative filter 525 is non-recursive—i.e., not reusing the output as an input. In one embodiment, the derivative filter 525 is a finite impulse response (FIR) filter.

Figure 6B:
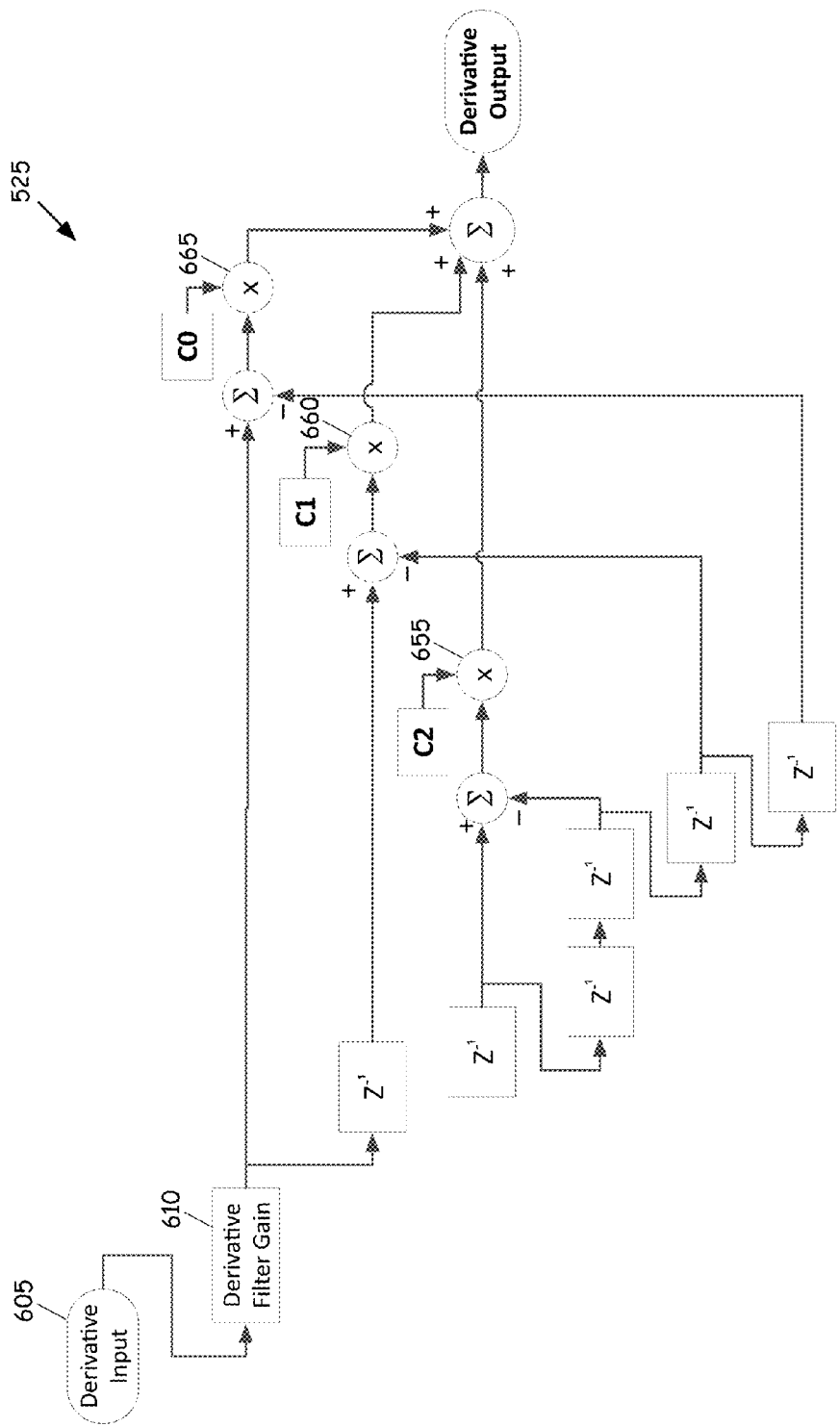
FIG. 6b illustrates an implementation of a derivative filter in accordance with exemplary embodiments.

FIG. 6b illustrates another exemplary implementation of the derivative filter 525 of FIG. 5 in various embodiments. Compared to the implementation illustrated in FIG. 6a, the implementation illustrated in FIG. 6b is simplified by having a symmetric structure for the filter coefficients. For example, C6 is set to −C0, C5 is set to −C1, and C4 is set to −C2. Having such symmetric coefficients limits the number of multiplication operations (i.e., from six to three as indicated by the six multipliers 625-640 in FIG. 6a and the three multipliers 655-665 in FIG. 6b) and enforces the symmetry of the coefficients (i.e., prevents a set of six coefficients that are not symmetric from being loaded).

Figure 7:
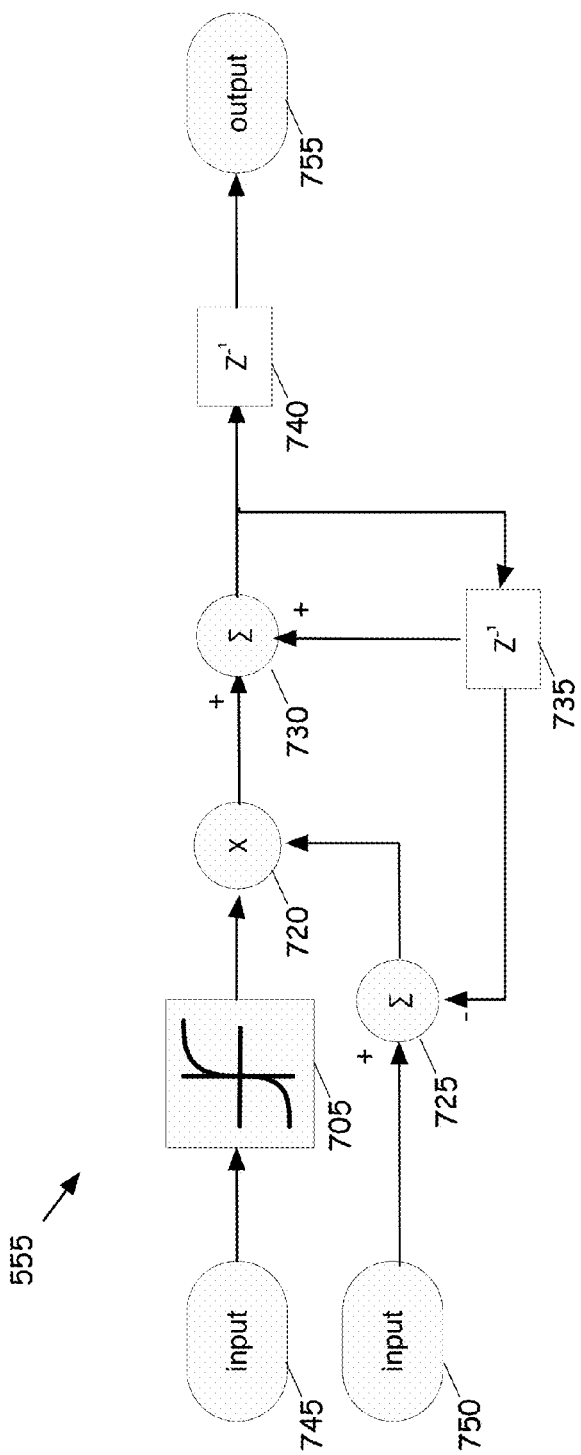
FIG. 7 illustrates an implementation of a low pass filter in accordance with exemplary embodiments.

FIG. 7 illustrates an exemplary implementation of the LPF 555 of FIG. 5. As shown, an output of the LFP 555 is calculated based on inputs 745 and 750. In one embodiment, the input 745 is $L_d/R$ and the input 750 is $$\frac{T_{CMD}}{K_e}\omega_e L_q - V\sin(\delta).$$

In one embodiment, the LPF 555 also includes a look up table 705 to find a cut off value for the input 750 based on the input 745. In one embodiment, a ratio of one millisecond and the input 745 is used to find the cut off value from the look up table 705. Alternatively, in one embodiment, the look up table 705 may be replaced with an equation $$1 - e^{-\frac{T}{\tau}},$$

where T is a sampling time period (e.g., one millisecond) and τ is the input 745. The rest of this exemplary implementation of the LPF includes a multiplier 720, adders 725 and 730, and 1/Z blocks 735 and 740. In one embodiment, the initial conditions for the 1/Z blocks 735 and 740 are set to zero.

Figure 8:
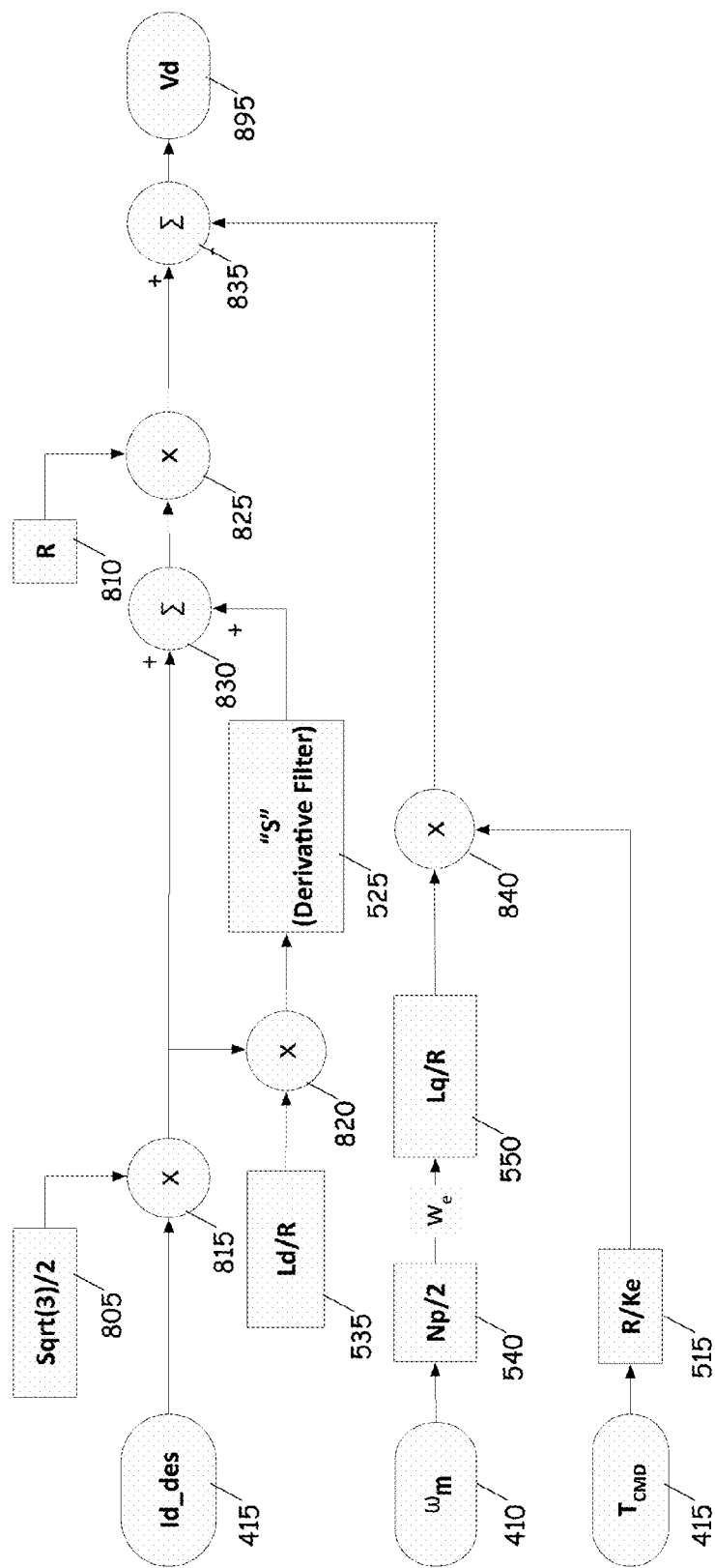
FIG. 8 is a block diagram that illustrates calculation of a voltage command in accordance with exemplary embodiments.

FIG. 8 is a block diagram that illustrates an implementation of a voltage command calculation module 800. Specifically, this module 800 calculates $V_d$ 895 according to the equation 11 in one embodiment. As shown, the module 800 takes as inputs the torque command 415, the motor velocity $\omega_m$ 410, and the directly commanded $I_{d\_des}$ 405.

A square root(3)/2 block 805, the $L_q$/R block 535, the derivative filter 525, a resistance block 810, multipliers 815-825, and an adder 830 together implement the first term $$I_{d\_des} \frac{\sqrt{3}}{2} R\left(\frac{L_d}{R}s + 1\right)$$

of the equation 11. Exemplary implementations of the derivative filter 525 are described above by reference to FIGS. 6a and 6b. The pole number block 540, the $L_q$/R block 550, the R/$K_e$ block 515, and an adder 840 implement the second term $$\frac{T_{CMD}}{K_e} \omega_e L_q$$

of the equation 11. An adder 835 adds the calculated first term of the equation 11 and the negative of the second term of the equation 11 to output $V_d$ 895.

Figure 9:
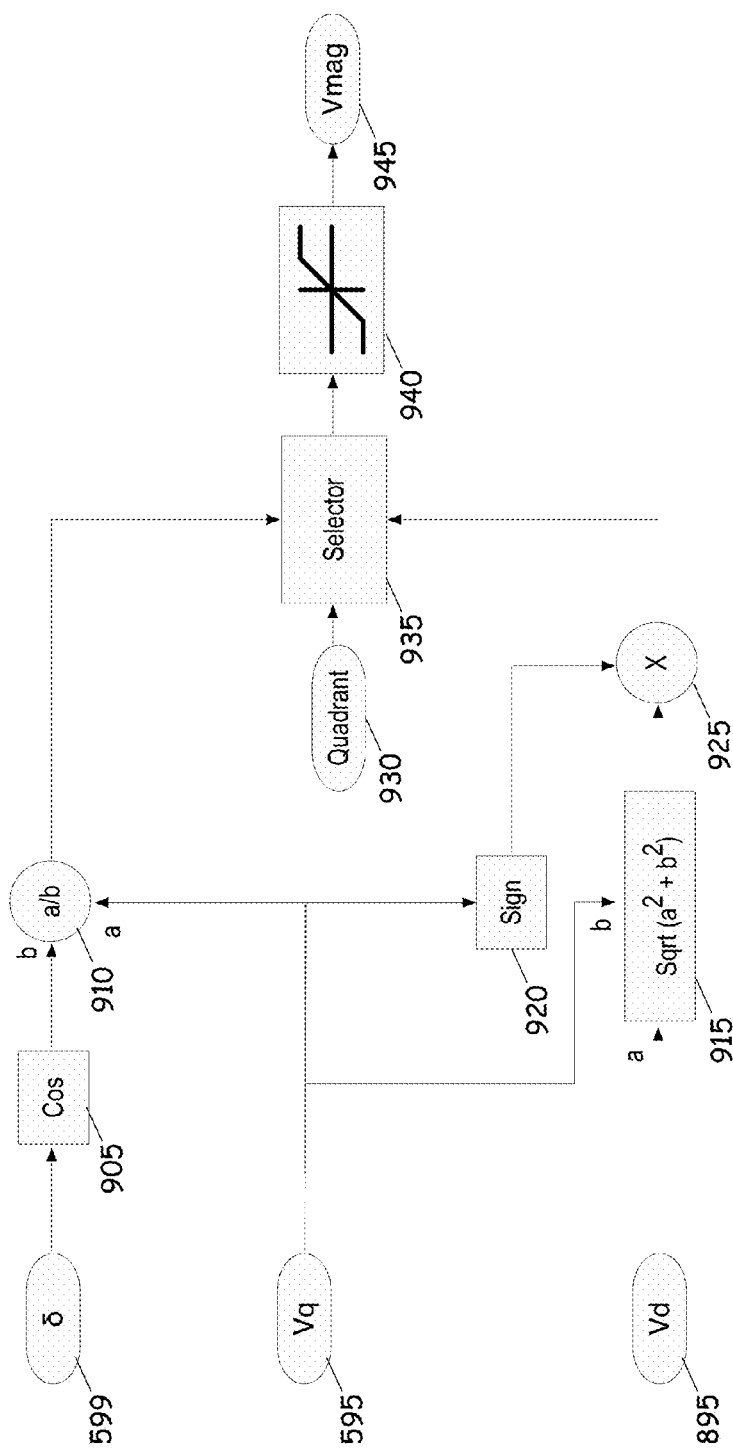
FIG. 9 is a block diagram that illustrates calculation of a final voltage command in accordance with exemplary embodiments.

FIG. 9 is a block diagram that illustrates an implementation of a final voltage command calculation module 900 that computes the final voltage command $V_{mag}$ 945. The final voltage command calculation module 900 takes as inputs the phase advance angle 599, $V_q$ 595, and $V_d$ 895. A cosine block 905 and the divider 910 compute the voltage magnitude according to the equation 9 based on the phase advance angle 599 and $V_q$ 595. The hypotenuse block 915 and the sign block 920 compute the voltage magnitude according to the equation 10 based on $V_q$ 595 and $V_d$ 895. The selector 935 selects one of the voltage magnitudes computed according to the equations 9 and 10 based on the quadrant in which the motor is operating. That is, the selector 935 selects the voltage magnitude computed according to the equation 9 when the motor is operating in quadrants I or III. Otherwise, the selector 935 selects the voltage magnitude computed according to the equation 10. In one embodiment, the selected voltage magnitude signal may be limited to a range of values by a saturator 940. In one embodiment, the final voltage magnitude 945 is fed back into the equations 7 and 8 to generate the next final voltage magnitude.

Figure 10:
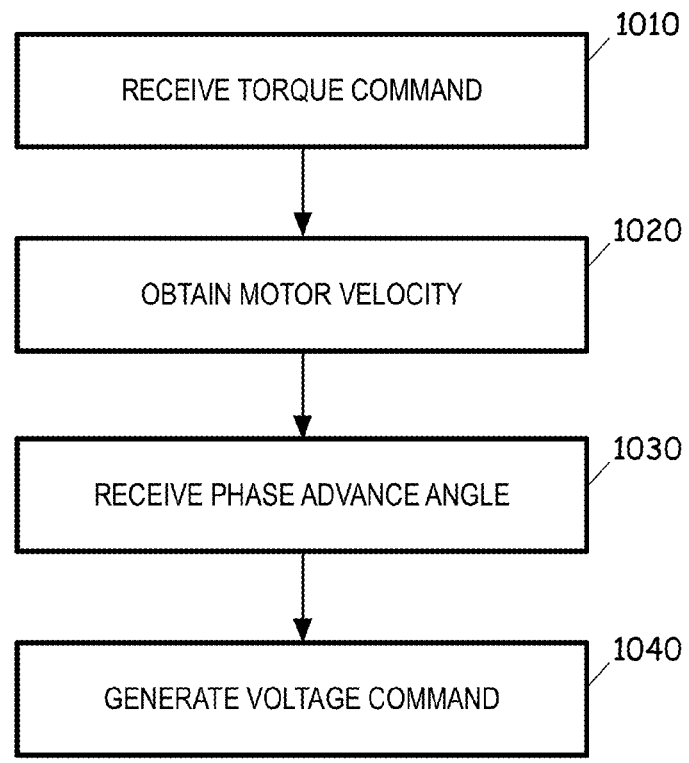
FIG. 10 is flow diagram illustrating a motor control method in accordance with exemplary embodiments.

Referring now to FIG. 10, a flow diagram illustrates a motor control method that can be performed by the control module 30 of FIG. 1 in one embodiment. As can be appreciated in light of the disclosure, the order of operation within the method is not limited to the sequential execution as illustrated in FIG. 10, but may be performed in one or more varying orders as applicable and in accordance with the present disclosure.

In one example, the method at 1010 receives a torque command indicating a desired amount of torque to be generated by the motor. In one embodiment, the torque command originates from another module (not shown in FIG. 1) that monitors the hand wheel movement (e.g., for the hand wheel angle and the hand wheel torque) and computes a desired amount of torque based on the hand wheel movement.

At 1020, the method obtains a rotational velocity of the motor. In one embodiment, the control module 30 receives an angular position θ of a rotor of the motor 20 of FIG. 1 periodically and computes the rotational velocity based on the received angular positions. At 1030, the method receives a desired phase advance angle for driving the motor.

At 1040, the method generates a voltage command indicating a voltage magnitude to be applied to the motor based on the rotational velocity of the motor, the motor torque command, and the desired phase advance angle by using the equations 7-11 that allow the desired phase advance angle to exceed ninety degrees.

A regenerative current limiting function used for deriving the equation 11 will now be described. In various embodiments, when controlling a sinusoidally excited motor, the phase advance angle may be selected based on various design goals. For example, optimal phase advance equations are derived to minimize the peak motor current. To derive the optimal phase advance equations, the steady state motor equations are written, for example, in motor q-axis and d-axis coordinates as follows:

$$V_q = RI_q + \omega_e L_d I_d \frac{\sqrt{3}}{2} + K_e \omega_m \qquad \text{Equation 12}$$

$$V_d = -\omega_e L_q I_q + RI_d \frac{\sqrt{3}}{2} \qquad \text{Equation 13}$$

$$T_e = K_e I_q \qquad \text{Equation 14}$$

$$\omega_m = \frac{2}{N_p} \omega_e \qquad \text{Equation 15}$$

The phase advance angle of the motor voltage command with respect to the motor BEMF waveform is represented by δ and may be calculated with the following equation 16:

$$\delta = \text{Tan}^{-1}\left(\frac{-V_d}{V_q}\right) \qquad \text{Equation 16}$$

It is to be noted that the d-axis vector is considered positive when the vector is pointing to the right side as shown in FIG. 2.

In order to minimize the peak current, the d-axis current should be zero whenever possible. For motor voltages below the available supply voltage, the optimal phase advance may be computed by the following equation, which is derived by setting $I_d=0$ in the above equations 12-15 and solving for $\delta$ using the equation 16. The result is referred to as optimal phase advance angle $\delta_2$.

$$\delta_2 = \text{Tan}^{-1}\left(\frac{\omega_e L_q \frac{T_{CMD\_SCL}}{K_e}}{K_e \omega_e \frac{2}{N_p} + \frac{TR}{K_e}}\right) \qquad \text{Equation 17}$$

In one embodiment, the magnitude of the value computed for $\delta_2$ is limited by the maximum $\delta_2$ phase advance ($\delta_2$MAX) equation 18 given below (save the sign of the computed $\delta_2$ and reapply after limiting). This magnitude limiting should be performed because the noise on motor velocity near zero motor velocity could potentially cause the sign of the limit value to be opposite of the sign of $\delta_2$.

$$\delta_2\text{MAX} = \text{Tan}^{-1}\frac{|\omega_e|L_q}{R} \qquad \text{Equation 18}$$

When the supply voltage limit is reached, the $I_d$ current is allowed to be nonzero to continue to get the desired torque out of the motor (this is referred to as field weakening). Using phase advance with field weakening allows the torque vs. speed performance of a given motor/control module to be expanded. In order to derive the equation for the optimal phase advance $\delta_1$ at the supply voltage limit, the equations 12-15 above may be solved again with the voltage set constant at the supply voltage (e.g., modulator input voltage, or DC Link Voltage).

$$X = \frac{\frac{T_{cmd\_SCL}}{K_e}(R^2 + \omega_e^2 L_q L_d) + \frac{2\omega_e K_e R}{N_p}}{DCLinkLimit} \qquad \text{Equation 18}$$

$$\delta_1 = \text{Tan}^{-1}\left(\frac{X^2 - R^2}{R\omega_e L_d + X\sqrt{R^2 + \omega_e^2 L_q L_d - X^2}}\right) \qquad \text{Equation 19}$$

The value computed for $\delta_1$ may be limited by the maximum $\delta_1$ phase advance ($\delta_1$MAX) equation given below:

$$\delta_1\text{MAX} = \text{Tan}^{-1}\frac{\omega_e L_q}{R} \qquad \text{Equation 20}$$

One or more of the following exceptions to the above calculations of phase advance angle may apply. The first exception is when operating in quadrant III, the minimum, or most negative value, instead of the maximum should be used for the equation 11. When the torque command is zero, the maximum should be used if the motor speed is positive and the minimum should be used if the motor speed is negative. The second exception is that after calculating $\delta$, a limit is applied to the calculated value to ensure $\delta$ is within a legal range.

Another embodiment of phase advance calculation is described when used for control of the supply regeneration current. Equation 22 described below for phase advance may be used for quadrants II and IV when the option to limit the amount of supply current regenerated to the vehicle supply is required. This equation allows the amount of supply current regenerated to be calibratable by setting a non-zero desired value of $I_d$ current in quadrants II and IV, targeted to provide just enough supply current limiting to meet motor design requirements. An embodiment of this equation for phase advance to be used in quadrants II and IV is as follows:

$$\delta_3 = \text{Tan}^{-1}\left(\frac{\omega_e L_q \frac{T_{CMD\_SCL}}{K_e} - RI_{d\_des}\frac{\sqrt{3}}{2}}{K_e \omega_e \frac{2}{N_p} + \frac{TR}{K_e} + \omega_e L_d I_{d\_des}\frac{\sqrt{3}}{2}}\right) \qquad \text{Equation 22}$$

The numerator of the input to the arc tangent in the equation 22 is a steady state version of the equation 11.

In an embodiment, the pre-calculated terms from a voltage control sub-function may be used instead of the equation 22, as follows:

$$\text{Term\_D} = \omega_e L_d I_{d_{des}} \frac{\sqrt{3}}{2} \qquad \text{Equation 23}$$

$$\text{Term\_E} = RI_{d\_des}\frac{\sqrt{3}}{2}$$

$$V_q = \text{Term\_A} + \text{Term\_B}_{ss} + \text{Term\_D}$$

$$V_d = -\text{Term\_B}_{ss} * \text{Term\_X}_q + \text{Term\_E} \qquad \text{Equation 24}$$

$$\delta_3 = \text{Tan}^{-1}\left(\frac{-V_d}{V_q}\right) \qquad \text{Equation 25}$$

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system, comprising:
a motor configured to operate at a rotational velocity; and
a control module in communication with the motor, the control module configured to:
receive a torque command indicating a desired amount of torque to be generated by the motor:
obtain a rotational velocity of the motor;
receive a desired phase advance angle for driving the motor; and
generate a voltage command indicating a voltage magnitude to be applied to the motor based on the rotational velocity of the motor, the motor torque command, and the desired phase advance angle by using a plurality of dynamic inverse motor control model equations that (i) allow the desired phase advance angle to exceed an impedance angle of the motor and (ii) specify that the voltage magnitude is a function of a voltage magnitude of a previous voltage command,
wherein the plurality of equations include:

$$V_q = T_{CMD}\frac{R}{K_e}\left(\frac{L_q}{R}s+1\right) + K_e\omega_m + \frac{\omega_e L_d}{R}\left(\frac{\frac{T_{CMD}}{K_e}\omega_e L_q - V\sin(\delta)}{\frac{L_d}{R}s+1}\right)$$

and $$V_d = R\left(\frac{L_d}{R}s+1\right)\left(\frac{V\cos(\delta) - T_{CMD}\frac{R}{K_e}\left(\frac{L_q}{R}s+1\right) - K_e\omega_m}{\omega_e L_d}\right) - \frac{T_{CMD}}{K_e}\omega_e L_q,$$

wherein

V is the voltage magnitude applied to the motor, $V_q$ is a quadrature axis vector component of a motor voltage in phase with a motor back electromotive force (BEMF);

$V_d$ is a d-axis vector component of the motor voltage that is 90 degrees out of phase with the motor BEMF;

δ is the phase advance angle, which is an angle of the applied voltage relative to the BEMF in radians;

$L_q$ and $L_d$ are stator q-axis and d-axis inductances in Henries, respectively, R is a motor circuit resistance in Ohms, including a motor stator and controller hardware, $K_e$ is a motor voltage constant in voltage per radian per second, $\omega_m$ is a rotor mechanical velocity in radian per second, $\omega_e$ is a rotor electrical velocity in radian per second, $I_d$ is a direct axis current in amperes, $I_q$ is a quadrature axis current in amperes, $T_{CMD}$ is the torque command in Newton meter, and s is a Laplace operator.

2. The motor control system of claim 1, wherein the control module is further configured to: receive a desired amount of regenerative current; and limit a regenerative current to be generated by the motor to the desired amount of regenerative current by applying the generated voltage command to the motor.

3. The motor control system of claim 1, wherein the control module obtains a rotational velocity of the motor by receiving a rotational position of the motor and computing the rotational velocity based on the rotational position.

4. The motor control system of claim 1, wherein the plurality of equations further comprise $$V = \frac{V_q}{\cos(\delta)},$$

wherein the method further comprises using $$V = \frac{V_q}{\cos(\delta)}$$

to compute the voltage command when the phase advance angle δ is less than 90 degrees.

5. The motor control system of claim 1, wherein the plurality of equations further comprise $V=\text{Sign}(V_q)\sqrt{V_q^2+V_d^2}$, wherein the control module is further configured to use $V=\text{Sign}(V_q)\sqrt{V_q^2+V_d^2}$ to compute the voltage command when the phase advance angle δ is greater than 90 degrees, wherein $\text{Sign}(V_q)$ is a function that outputs a sign of $V_q$.

6. The motor control system of claim 1, wherein the control module is further configured to send the voltage command to the motor to control the motor.

7. The motor control system of claim 1, wherein the control module comprises a non-recursive derivative filter that is configured to calculate derivative terms of the dynamic inverse motor model equations.

8. The motor control system of claim 7, wherein at least two of filter coefficients that the non-recursive derivative filter is configured to use same coefficient values with opposite signs.

9. A motor control system, comprising:
a motor configured to operate at a rotational velocity; and
a control module in communication with the motor, the control module configured to:
receive a torque command indicating a desired amount of torque to be generated by the motor:
obtain a rotational velocity of the motor;
receive a desired phase advance angle for driving the motor; and
generate a voltage command indicating a voltage magnitude to be applied to the motor based on the rotational velocity of the motor, the motor torque command, and the desired phase advance angle by using a plurality of dynamic inverse motor control model equations that (i) allow the desired phase advance angle to exceed an impedance angle of the motor and (ii) specify that the voltage magnitude is a function of a voltage magnitude of a previous voltage command,
wherein the plurality of equations include:

$$V_q = T_{CMD}\frac{R}{K_e}\left(\frac{L_q}{R}s+1\right) + K_e\omega_m + \frac{\omega_e L_d}{R}\left(\frac{\frac{T_{CMD}}{K_e}\omega_e L_q - V\sin(\delta)}{\frac{L_d}{R}s+1}\right)$$

and $$V_d = I_{d\_des}\frac{\sqrt{3}}{2}R\left(\frac{L_d}{R}s+1\right) - \frac{T_{CMD}}{K_e}\omega_e L_q,$$

wherein

V is the voltage magnitude applied to the motor, $V_q$ is a quadrature axis vector component of a motor voltage in phase with a motor back electromotive force (BEMF);

$V_d$ is a d-axis vector component of the motor voltage that is 90 degrees out of phase with the motor BEMF;

δ is the phase advance angle, which is an angle of the applied voltage relative to the BEMF in radians;

$L_q$ and $L_d$ are stator q-axis and d-axis inductances in Henries, respectively, R is a motor circuit resistance in Ohms, including a motor stator and controller hardware, $K_e$ is a motor voltage constant in voltage per radian per second, $\omega_m$ is a rotor mechanical velocity in radian per second, $\omega_e$ is a rotor electrical velocity in radian per second, $I_{d\_des}$ is a direct axis current in amperes, $T_{CMD}$ is the torque command in Newton meter, and s is a Laplace operator.

10. The motor control system of claim 9, wherein the rotor mechanical velocity corn is the rotational velocity of the motor, wherein the electrical velocity toe is calculated by multiplying the mechanical velocity C0m by a number of poles of the motor, and dividing a product of the mechanical velocity C0m and the number of poles by two.

11. A method for controlling a motor of an electronic power steering (EPS) system, the method comprising:
receiving a torque command indicating a desired amount of torque to be generated by the motor;
obtaining a rotational velocity of the motor;
receiving a desired phase advance angle for driving the motor; and
generating a voltage command indicating a voltage magnitude to be applied to the motor based on the rotational velocity of the motor, the motor torque command, and the desired phase advance angle by using a plurality of dynamic inverse motor control model equations that (i) allow the desired phase advance angle to exceed an impedance angle of the motor and (ii) specify that the voltage magnitude is a function of a voltage magnitude of a previous voltage command,
wherein the plurality of equations include:

$$V_q = T_{CMD}\frac{R}{K_e}\left(\frac{L_q}{R}s+1\right) + K_e\omega_m + \frac{\omega_e L_d}{R}\left(\frac{\frac{T_{CMD}}{K_e}\omega_e L_q - V\sin(\delta)}{\frac{L_d}{R}s+1}\right)$$

and $$V_d = R\left(\frac{L_d}{R}s+1\right)\left(\frac{V\cos(\delta) - T_{CMD}\frac{R}{K_e}\left(\frac{L_q}{R}s+1\right) - K_e\omega_m}{\omega_e L_d}\right) - \frac{T_{CMD}}{K_e}\omega_e L_q,$$

wherein
V is the voltage magnitude applied to the motor,
$V_q$ is a quadrature axis vector component of a motor voltage in phase with a motor back electromotive force (BEMF);
$V_d$ is a d-axis vector component of the motor voltage that is 90 degrees out of phase with the motor BEMF;
δ is the phase advance angle, which is an angle of the applied voltage relative to the BEMF in radians;
$L_q$ and $L_d$ are stator q-axis and d-axis inductances in Henries, respectively,
R is a motor circuit resistance in Ohms, including a motor stator and controller hardware,
$K_e$ is a motor voltage constant in voltage per radian per second,
$\omega_m$ is a rotor mechanical velocity in radian per second,
$\omega_e$ is a rotor electrical velocity in radian per second,
$I_d$ is a direct axis current in amperes,
$I_q$ is a quadrature axis current in amperes,
$T_{CMD}$ is the torque command in Newton meter, and
s is a Laplace operator.

12. The method of claim 11 further comprising:
receiving a desired amount of regenerative current; and
limiting a regenerative current to be generated by the motor to the desired amount of regenerative current by applying the generated voltage command to the motor.

13. The method of claim 11, wherein the obtaining a rotational velocity of the motor comprises receiving a rotational position of the motor and computing the rotational velocity based on the rotational position.

14. The method of claim 11, wherein the plurality of equations further comprise $$V = \frac{V_q}{\cos(\delta)}$$

wherein the method further comprises using $$V = \frac{V_q}{\cos(\delta)}$$

to compute the voltage command when the phase advance angle δ is less than 90 degrees.

15. The method of claim 11, wherein the plurality of equations further comprise $V=\text{Sign}(V_q)\sqrt{V_q^2+V_d^2}$, wherein the control module is further configured to use $V=\text{Sign}(V_q)\sqrt{V_q^2+V_d^2}$ to compute the voltage command when the phase advance angle δ is greater than 90 degrees, wherein Sign $(V_q)$ is a function that outputs a sign of $V_q$.

16. The method of claim 11 further comprising sending the voltage command to the motor to control the motor.

17. A method for controlling a motor of an electronic power steering (EPS) system, the method comprising:
receiving a torque command indicating a desired amount of torque to be generated by the motor;
obtaining a rotational velocity of the motor;
receiving a desired phase advance angle for driving the motor; and
generating a voltage command indicating a voltage magnitude to be applied to the motor based on the rotational velocity of the motor, the motor torque command, and the desired phase advance angle by using a plurality of dynamic inverse motor control model equations that (i) allow the desired phase advance angle to exceed an impedance angle of the motor and (ii) specify that the voltage magnitude is a function of a voltage magnitude of a previous voltage command,
wherein the plurality of equations include:

$$V_q = T_{CMD}\frac{R}{K_e}\left(\frac{L_q}{R}s+1\right) + K_e\omega_m + \frac{\omega_e L_d}{R}\left(\frac{\frac{T_{CMD}}{K_e}\omega_e L_q - V\sin(\delta)}{\frac{L_d}{R}s+1}\right)$$

and $$V_d = I_{d\_des}\frac{\sqrt{3}}{2}R\left(\frac{L_d}{R}s+1\right) - \frac{T_{CMD}}{K_e}\omega_e L_q,$$

wherein
V is the voltage magnitude applied to the motor,
$V_q$ is a quadrature axis vector component of a motor voltage in phase with a motor back electromotive force (BEMF);
$V_d$ is a d-axis vector component of the motor voltage that is 90 degrees out of phase with the motor BEMF;
δ is the phase advance angle, which is an angle of the applied voltage relative to the BEMF in radians;
$L_q$ and $L_d$ are stator q-axis and d-axis inductances in Henries, respectively,
R is a motor circuit resistance in Ohms, including a motor stator and controller hardware,
$K_e$ is a motor voltage constant in voltage per radian per second,
$\omega_m$ is a rotor mechanical velocity in radian per second,
$\omega_e$ is a rotor electrical velocity in radian per second,
$I_{d\_des}$ is a direct axis current in amperes,
$T_{CMD}$ is the torque command in Newton meter, and
s is a Laplace operator.

18. The method of claim 17, wherein the rotor mechanical velocity corn is the rotational velocity of the motor, wherein the electrical velocity ωe is calculated by multiplying the mechanical velocity ω0m by a number of poles of the motor, and dividing a product of the mechanical velocity ω0m and the number of poles by two.

* * * * *